United States Patent [19]

Gutsche

[11] Patent Number: 5,020,307

[45] Date of Patent: Jun. 4, 1991

[54] METHOD AND APPARATUS FOR WATER HARVESTING

[76] Inventor: Guenter E. Gutsche, 4476 Forget, Terrebonne Quebec, Canada, J6X 1Z4

[21] Appl. No.: 390,965

[22] Filed: Aug. 8, 1989

[51] Int. Cl.$^5$ .......................................... A01D 44/00
[52] U.S. Cl. ............................................... 56/8; 56/330; 209/17; 209/173
[58] Field of Search ............................. 56/8, 330, 331; 209/235, 268, 391, 417-419, 17, 173, 267-273

[56] References Cited

U.S. PATENT DOCUMENTS

| | | | |
|---|---|---|---|
| Re. 2,910 | 4/1868 | Shaw | 209/683 X |
| 319,352 | 6/1885 | Trahern | 56/8 |
| 389,114 | 9/1888 | Shaw | 56/330 |
| 543,710 | 7/1895 | Tate | 209/391 X |
| 660,527 | 10/1900 | Crowther | 209/391 X |
| 674,513 | 5/1901 | McKeever | 209/419 |
| 994,654 | 6/1911 | Parker | 209/173 |
| 1,186,677 | 6/1916 | Parker | 209/173 |
| 1,461,067 | 7/1923 | Moser | 209/2 |
| 1,684,365 | 9/1928 | Dolbear | 209/2 |
| 1,758,756 | 5/1930 | Morgan | 209/173 |
| 2,094,535 | 9/1937 | Harrison | 56/8 |
| 2,597,131 | 5/1952 | Sempoo | 56/8 |
| 2,657,512 | 11/1953 | Cramdon et al. | 56/8 |
| 2,976,992 | 3/1961 | Bloch | 209/2 |
| 3,231,087 | 1/1966 | Cusi | 209/270 X |
| 3,389,542 | 6/1968 | Rasmussen | 56/331 |
| 3,666,091 | 5/1972 | Ludlum | 209/17 X |
| 4,225,424 | 9/1980 | Patzlaff | 209/173 X |
| 4,435,285 | 3/1984 | Okouchi et al. | 209/17 X |
| 4,501,111 | 2/1985 | Abbott | 56/8 |
| 4,858,769 | 8/1989 | DeVries | 209/173 X |

FOREIGN PATENT DOCUMENTS

| | | | |
|---|---|---|---|
| 2515991 | 5/1983 | France | 209/173 |
| 975115 | 11/1982 | U.S.S.R. | 209/17 |

Primary Examiner—Hoang C. Dang

[57] ABSTRACT

An improved method and apparatus for water harvesting wherein a separator grating is lowered into the water to hold trash below the harvestable berries that are then caused by their buoyancy to rise through the immersed separator. The berries thus separated from the debris are gathered in various ways, such as the conventional loading via a conveyor, removing the berries by lifting the separator grating after the apertures of the separator have been reduced, or using a second grating with smaller openings. The method can be carried out in a reciprocating cycle or using a continuous rotating movement of the separator that might be part of a band scoop, mechanically powered scoop, or rolling harvesting apparatus. Provisions are also provided to simultaneously remove the debris separated from the berries from the flooding water. The method and apparatus might also be used in cleaning the harvest in a flooded tank on the dike.

16 Claims, 5 Drawing Sheets

METHOD AND APPARATUS FOR WATER HARVESTING

BACKGROUND OF THE INVENTION

1. Field of the Invention

The present invention relates to water harvesting apparatus and more particularly to methods and devices to separate cranberries from debris floating in the water during the harvesting.

Cranberries that are destined for processing into juice and sauce are normally mechanically beaten off their vines. This is done after the bog has been flooded to raise the vine by the buoyancy of the berries. The beating process also dislodges vines and other debris or trash as well as the leaves off the plants that then remain in suspension in the water in the interval between the beating operation and the gathering of the berries. At the point of loading the cranberries onto the conveyor there are typically encountered two distinct types of trash or floating debris. First the many small leaves typically about ½" by ¼" in size that are routinely washed off the berries without much difficulty prior to loading into the moving vehicles. Second, various lengths of torn vine, weeds, grass, pine needles and other windborne particles. Because this type of trash intertwines with more than one berry, it has proven difficult to separate once it has been gathered with the cranberries. Growers regularly experience financial losses because of rejection of part of their shipments due to the presence of this trash. Further, a considerable part of the potential harvest is lost in the matting, entrapping berries that can not be economically freed once the floatsam has been moved out of the water. The prior art shows several attempts to separate harvestable fruit from rejects by their specific weight or dimension. One such example is the U.S. Pat. No. 2,976,992 to Bloch.

In this device the greater buoyancy of closed and sound nuts is used to separate them from less buoyant and open rejects. A number of processes and devices have been contemplated to classify minerals and ores at processing plants using a combination of gratings and flotation processes. As only one typical example might be cited the U.S. Pat. No. 1,461,067 issued to Moser, which uses grating of various fineness to classify grades of gravel passing through them.

SUMMARY OF THE INVENTION

The present invention is differenciated from the prior art separation processes that attempt to separate rejected matter after the gathering of the harvest by doing the separating while the berries and debris are still mixed in the water of the flooded bog or separator tank. It also differs from the prior art separators in a further aspect, in that the selected material or crop is moved through the separator grating upward into the collector by buoyancy. In one embodiment of the invention the invented method uses one synergistic motion of a submersible separator or grating that both depresses the larger trash into the water floating the berries and allows the buoyant berries to rise above the separator that then can be selectively restricted to serve also as lifting means to load the berries. In another embodiment the separator is in the periphery of a barrel shaped harvesting apparatus and the action of rolling the barrel or truncated cone through the water synergistically depresses the rejected debris, admits the cranberries into the harvester and lifts the fruit out of the water with the option to gather trash from the outside of the grating for disposal. In these many aspects the present invention is distinct and an improvement over the devices of the prior art.

It is accordingly the objective of the invention to provide a method that uses the abundance of water to allow the separation of large trash from cranberries prior to loading the crop.

Another object of the invention is to increase the portion of the berries grown to be delivered to the consumer.

A further object of the invention is to increase the revenue of the grower as well as the efficiency of the processing of water harvested cranberries.

Another object of the invention is to provide a variety of harvesting apparatus that increase both the efficiency and the quality of the harvest operation.

The objects of the invention are accomplished in the following embodiments, methods and steps.

In one aspect of the invention the method of separating floating trash from the cranberries is accomplished by lowering a submersible grating with apertures greater than the selected fruit into the water and then to gather the berries that have been floated through the grating or separator.

In another aspect of the invention the method is carried out by using a separator with variable or closing apertures and changing the aperture to a size smaller than the acceptable fruit and lifting the berries out of the water by lifting the thus constricted grating.

In another aspect of the invention the method is carried out by lifting the berries floated through the first separator out of the water by using a second separator.

In a further aspect of the invention there is provided a manual scoop with a separator having restrictable apertures.

In another aspect of the invention the method is carried out by a manual scoop having one separator to admit harvestable berries and a second grating with smaller openings to lift the berries out of the water.

In another aspect of the invention there is provided mechanical power to lower the separators into the water, change the configuration of the separator and load the berries.

In a further aspect of the invention there is provided a barrel or truncated cone shaped harvester having a separating mechanism comprising a separator grating at the periphery and wherein by rolling the separator through the flooding water selected berries are admitted into the harvesting apparatus to the exclusion of the larger trash while the floating berries in the interior of the harvesting apparatus are lifted out of the water by the rotation of baffles or vanes and the lifted berries are then caused to roll out of the harvester to be loaded.

In another aspect of the invention the rolling harvester is provided with a shield or screen that restricts or covers the apertures of the separator at the trailing side of the moving harvesting apparatus.

In another aspect of the invention provisions are made to remove and gather trash lifted from the water by the separator.

The invented method and apparatus are shown to be usable in the flooded bog or a flooded separator tank on shore.

Further aspects and advantages of the invention will be evident in the following description.

BRIEF DESCRIPTION OF THE DRAWINGS

The present invention is illustrated by way of example in the following drawings wherein.

DESCRIPTION OF THE PREFERRED EMBODIMENTS

Referring now in details to the drawings.

Figure 1:
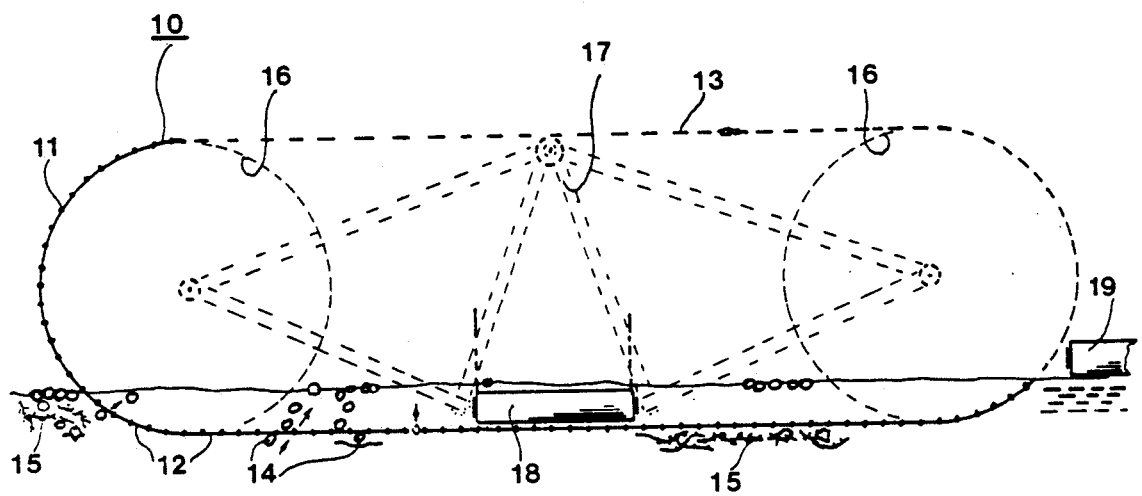
FIG. 1 is a sectioned view of a deployed separator in a cranberry bog.

FIG. 1 illustrates cranberry harvesting apparatus 10 that in its simplest form consists of submersible separator or grating 11 that has a specific weight greater than water and thereby has the means to be submersible in water. Separator 11 has apertures 12 that are greater than the cranberries 14 that are floating in the bog or tank. Trash or debris 15 is also seen to be floating in the water and seen to be held separated from the berries 14 that have been caused by their buoyancy to rise through apertures 12 to the surface of the water. A conveyor 18 is seen above the submerged portion of separator 11 ready to transport berries 14 toward the dike and the further loading into the transport vehicles (not shown). A further conveyor 19 is an option to transport part of trash 15 that has been lifted out of the water when rolling separator 11. A rake and water spray might be used by the operators to dislodge debris 15 thus lifted to be loaded into conveyor 19. Conveyors 18 and 19 would be supported in the conventional manner in the flooded bog by flotation devices or wheels (not shown) as they are well known to those skilled in the art. In phantom lines is shown the optional extension of separator 11 into a closed loop 13 that is rotated over reels 16 carried in appropriate bearings and tension devices on framework 17. Reels 16 could be of sufficient diameter to allow a worker to assist in loading berries 14 onto conveyor 18 while standing between portion 11 and 13 of the separator or grating 11. In carrying out the invented method, the cranberries would first be allowed to rise for a day after beating them off the vine. The separator 11 would then be immersed into the water, causing berries 14 to rise through its apertures 12 toward the water surface. Simultaneously the trash 15 is separated and held below separator 11. It would then be redeployed or wheeled by reels 16 into other areas to be harvested. When separator 11 or the other separators of this invention are used in a flooded tank, trash 15 left in the water after removal of berries 14 and separator 11 will be removed by suitable equipment to prepare the tank for the next separation cycle. The berries 14 would be loaded in the conventional manner by means of conveyors toward the transportation vehicles. During that process the rather small leaves of the cranberry vine can be washed from the berries in the conventional manner well known to those in the art. A vibrator or agitator might be used as in other devices to shake and dislodge berries 14 held entangled with debris 15 below separator 11. This will assist them to follow the step of the method to cause them to rise through apertures 12 by their buoyancy. This is a process that has been observed to take but a few seconds and the separator 11 and the other separating means or mechanism are understood to remain in place above the debris 15 long enough to carry out the step of causing the berries 14 to rise by their natural buoyancy toward the surface. Certain details such as the choice of materials has been omitted from the disclosure as they fall within the expertise of those skilled in the art. For example, the grating 11 might be fashioned from the commercially available galvanized grid with 1" apertures or an equivalent made from a weighted plastic. The separation process would also allow the loading of the berries into bags.

Figure 2:
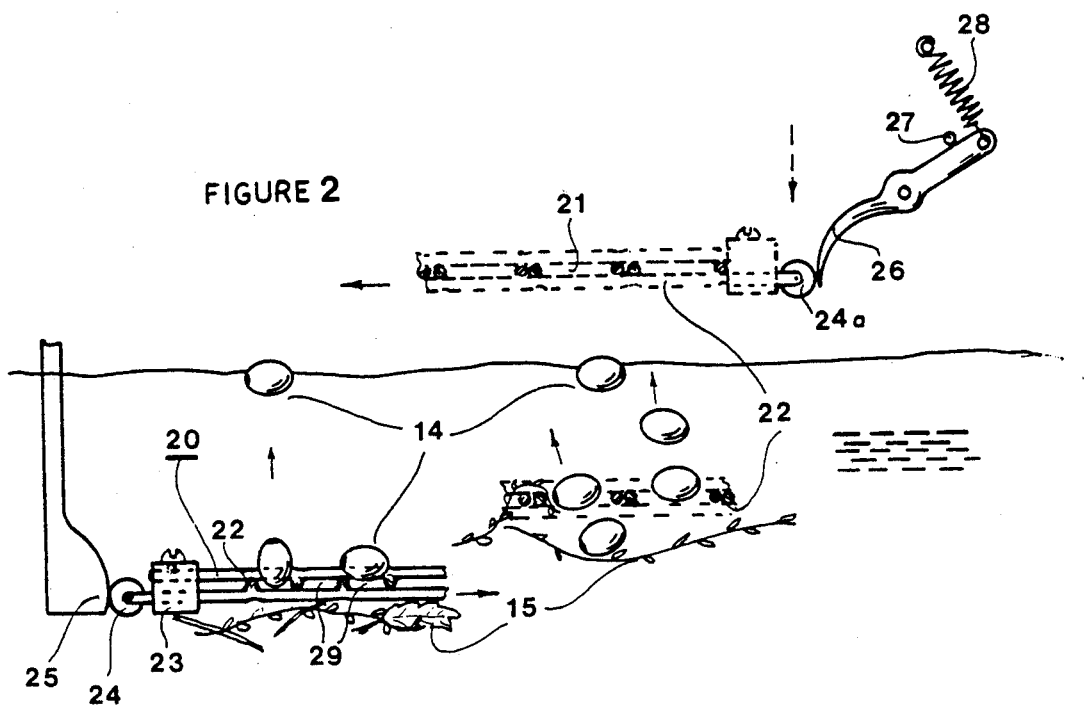
FIG. 2 is a sectioned view of an adjustable separator.

In FIG. 2 is diagrammatically illustrated a sectioned view of a separator or grating 20 according to the present invention. The apertures 21 are shown to be adjustable to a dimension smaller than cranberries 14 by the lateral movement of the reduction means used to restrict the apertures 21, namely the bars of grid 22. This grid 22 is slidably held against separator 20 by guiding bushings 23 and is shown closed to its small size 29 for openings 21 by cam 25 acting on low friction roller 24. Cam 25 is positioned with reference to any gathering apparatus carrying separator 20 so as to close apertures 21 after berries 14 have been caused to rise by their natural buoyancy through apertures 21. This sideway movement of the bars of grid 22 has the synergistic effect of loosening any loop of the weeds or trash 15 that could have formed during the step of holding the debris 15 below and separated from berries 14. In phantomlines is shown grid 22 as it passes one-way repeater cam 26. This cam 26 rotates out of the way held by spring 28 when separator 20 passes upward during the step of lifting the berries on their way to be loaded. However on the downstroke during the step of immersing the separator 20 into the water the pin 27 holds the cam 26 against roller 24a and slides grid 22 into the open position of apertures 21 to allow the step of causing berries 14 to pass upward above separator 20 prior to the closing action of cam 25. This is but one way to automatically carry out the step of reducing the dimension of apertures 21 to the reduced size 29 that is smaller than berries 14. Those in the art might employ mechanical equivalents according to the power transmissions available such as hydraulic actuators. Variations of this illustrated arrangement might be used on the other separating means shown in this disclosure whenever variable apertures are called for.

Figure 3:
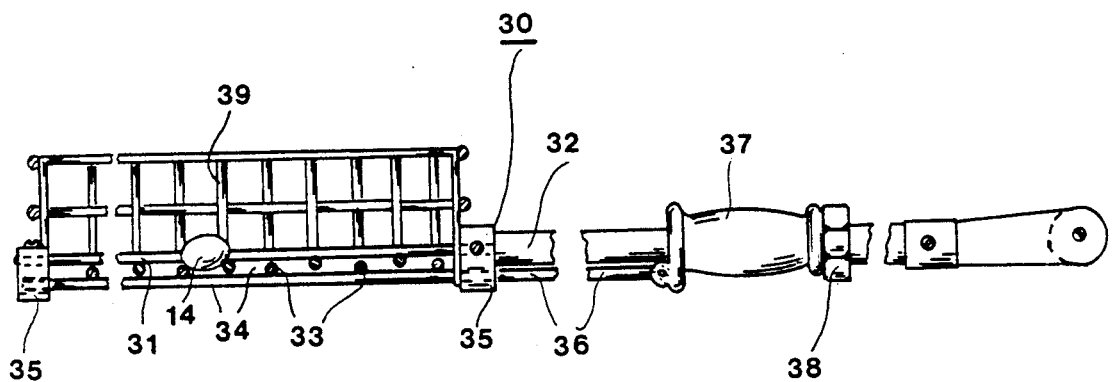
FIG. 3 is a sectioned view of a manual scoop.

FIG. 3 illustrates a partially sectioned view manual scoop 30, having separator or grating 31 attached to handle 32, which is the means to submerge scoop 30 into the water and the means to lift both separator 31 and any berries 14 out of the water. The bars 33 of a second grid are part of the means to reduce the size of apertures 34 and are held against separator 31 by bushings 35 in a sliding fit. Rod 36 connects bars 33 to sliding handle or grip 37. This grip 37 is made from a flexible material and moves laterally on handle 32 but is limited in its travel by bars 33 abutting against separator 31 and the stopping nut 38 that is adjustable by a thread on handle 32. Holding the grip 37 tightly will depress the flexible material inward against the handle 32 and lock grip 37. Through the connecting rod 36 the bars 33 are thus locked in either the closed or open position with respect to separator 31. In carrying out the method, grip 37 will be moved forward to open apertures 34 and then the separator 31 be immersed into the water by its weight, guided by handle 32. Screen 39 wil hold debris 15 away from berries 14 while they are caused by their buoyancy to rise through apertures 34 while trash 15 is held below separator 31. A slight shaking of scoop 30 will facilitate this step and free berries entangled in the weeds. Releasing the squeeze on grip 37 and moving it toward stop 38 and again firmly holding the grip 37 will lock bars 33 in mid-position inside apertures 34, thus reducing them in size to a dimension smaller than berries 14. The step of lifting the berries 14 out of the water is followed by emptying the scoops content into either a container or conveyance for the harvested fruit. It is evident from the illustration that an even simpler scoop (not shown) can be constructed using a separator 31 only in conjunction with an extended or larger second separator 39. In this embodiment that eliminates the size reduction means for apertures 34, greater dexterity is required by the operator in that the method has to be carried out by moving second separator 39 in an at least partially rotating and sideway movement under the berries that have been separated from the trash by the separator 31. Harvesting apparatus 30 would be useful in taking cranberries out of the bog in areas where the mechanized embodiments of this invention can not easily reach or for lifting berries from a tank before removing the trash.

Figure 4:
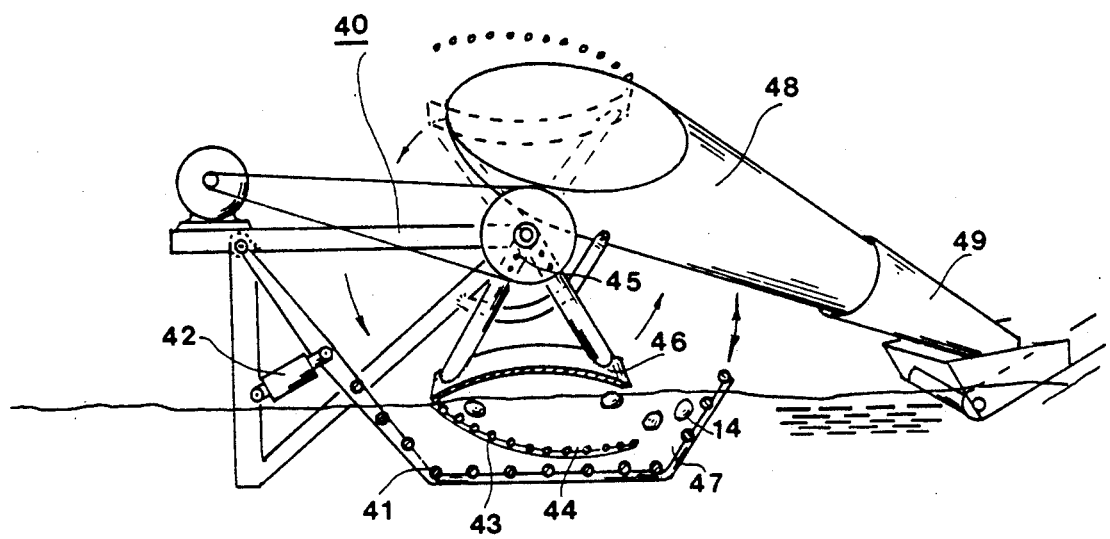
FIG. 4 is a sectioned view of a powered scoop.

In FIG. 4 is shown a partially sectioned mechanically powered scoop 40 having separator 41. Hydraulics 42 are the means whereby separator 41 can be lowered into the water flooding the bog or tank and to lift it to be moved to work another spot to be harvested. Grating 41 has apertures 47 that allow berries 14 to rise through it as shown in pr vious figures. A second separator 43 has openings 44 that are smaller in dimension than the berries 14 to be harvested. An axis and framework 45 are the guiding means whereby second grating 43 is moved in an orbit that allows it to enter the water and to move under floating berries 14 and scoop up and lift them into position near inclined chute 48. A scoop or chamber is formed by second separator 43 and the opposite surface 46. This surface 46 is so positioned that in the top portion of its movement shown in phantom lines, it inclines toward chute 48. This inclined surface 46 causes berries 14 to roll urged by gravity into the opening of inclined chute 48. A telescoping member 49 of chute 48 allows the harvesting apparatus 40 to be moved for working into areas at various distances from the dike, so as to harvest all berries floated off their plants. In carrying out the method the lifting and immersing means 42 could be controlled directly by an operator that is observing the condition in the bog or tank holding the berries 14 and trank 15. The guiding means 45 that move second separator 43 under the floating berries 14 is shown to define a circular orbit but an appropriately shaped groove and pinion arrangement (not shown) could have second grating 43 describe or follow an articulated orbit that would allow unloading into a conveyor. Again appropriate ancillary equipment such as vibrators and water jets well known to the art could facilitate the clean loading of the fruit or the optional gathering of trash in a simultaneous operation with the raising of separator 41. Suitable raking equipment (not shown) could be disposed on harvester 40 to allow lifting of trash 15 from the water in the bog or tank and then to recover it for disposal.

Figure 5:
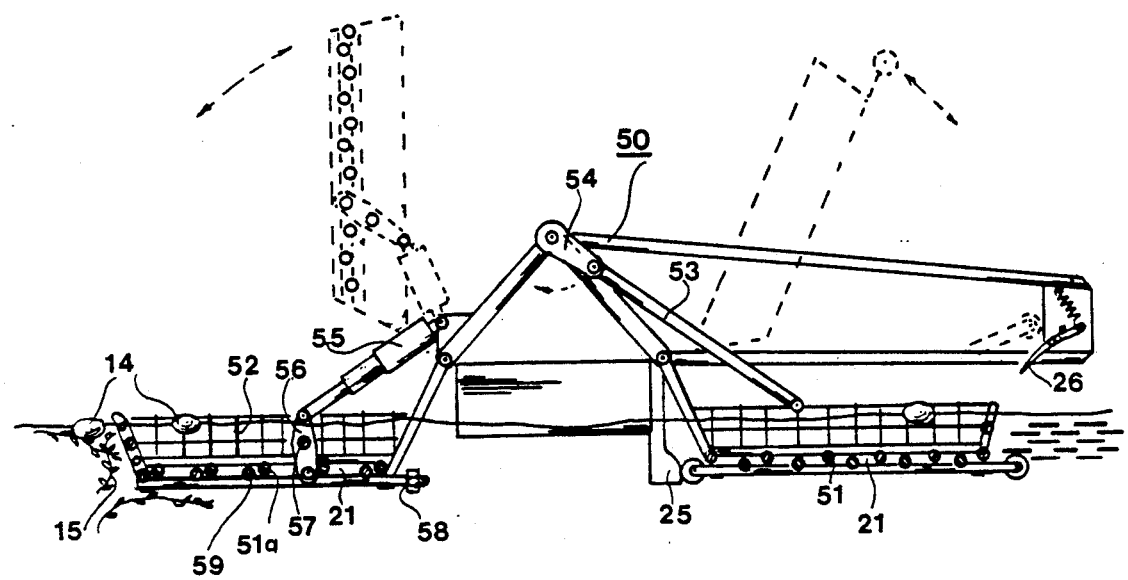
FIG. 5 is a sectioned view of a powered scoop.

In FIG. 5 is illustrated the partially sectioned view of harvesting apparatus 50 which has a set of two mechanically powered scoops used to load berries onto a conveyor. This dual arrangement of two opposingly working scoops affords a more balanced operation of harvester 50. The scoops have separators 51 and 51 a that work on the principle illustrated in FIGS. 2 and 3 in that the apertures 21 have means to reduce their size to a dimension smaller than berries 14. Secondary grating 52 with openings smaller than berries 14 acts as a barrier to berries 14 and trash 15 when separators 51 and 51a are immersed in the water. Power driven crank 54 that is linked to separator 51 by connecting rod 53 through suitable bearings is the means to immerse separator 51 into the water and the means to carry out the step of lifting separator 51 and berries from the water for the latter to be loaded onto a conveyor. Cam 25 and sequenced cam 26 are part of the means to selectively reduce the dimension of the apertures 21 separator 51. Cams 25 and 26 are so positioned that they close separator 51 to berries 14 at the end of the downstroke of separator 51 and open the apertures 21 prior to the step of the method of immersing separator 51 into the water floating the berries. Power and control of crank 54 can be supplied by any suitable means, such as a hydraulic drive that is favored by some in the art. While it is understood that both scoops of cranberry harvester 50 would be similar in design, the illustration shows an alternate means to actuate the separating grating 51a with its means to reduce the size ot the grating apertures. This is done for illustrative economy only. A hydraulic actuator 55 is part of the means to lift separator 51a out of the water and to immerse it therein to press down the trash 15. When exacting a pulling force on separator 51a to lift it, actuator 55 will first pull the lever 56 about pivot axis 57 against the adjustable stop 58. Lever 56 is shown to be connected to sliding grid 59 by a suitable bearing. The pull of actuator 55 will therefore start the step of reducing the apertures 21 before initiating the step of lifting separator 51a and berries 14 out of the water. Similarly at the beginning of the downstroke, the push of actuator 55 will push the bars of separator 51a and slideable grid 59 together, therefore preparing the way for the step of causing the berries to rise by their buoyancy through the thus opened apertures 21 when separator 51a is immersed into the water. The pivot point linking harvester 50 and separators 51a might have to be provided with adjustable friction discs (not shown) to prevent gravity from keeping apertures 21 in closed position. With sufficient resistance on the downstroke, the actuator 55 will push separator 51a downward after having first opened the apertures 21 by the lever 56. Without departing from the spirit of the invention the harvesting apparatus 50 could be so conceived that the berries 14 could be lifted higher to be loaded into a gravity feed chute illustrated earlier and also to accommodate the simultaneous removal of trash from the bog or tank. An appropriate flotation device or wheeled support (not shown) should maintain separators 51 at the appropriate levels with respect to the floating berries 14.

Figure 6:
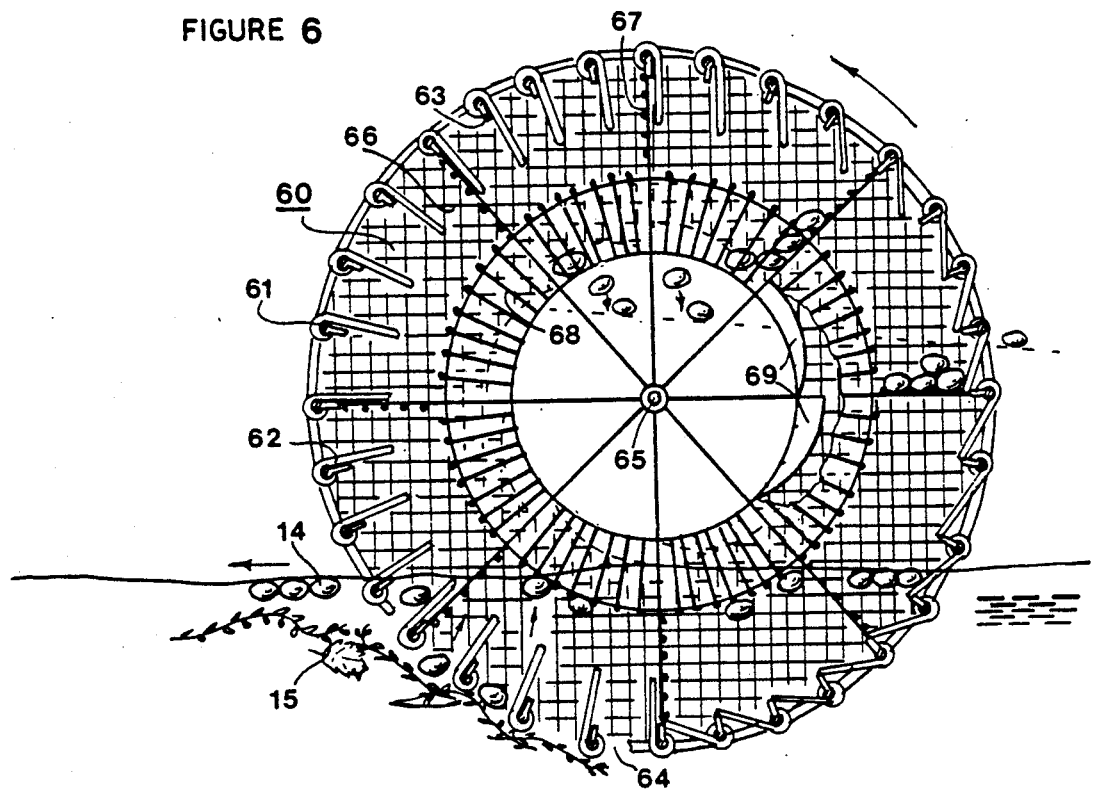
FIG. 6 is a sectioned view of a cranberry harvesting apparatus.

FIG. 6 shows in a partially sectioned view cranberry harvesting apparatus 60 having a separating means including separator 61. Grating 61 curves in one dimension and thus forms the periphery of a cylinder or truncated cone. By rotating about the axis of rotation 65, the harvester 60 moves through the flooded bog and synergistically carries out the steps of immersing and lifting the separator 61. The apertures 64 of separator 61 are equipped with hinged flaps or pins 62 that are restricted in their movement by abutment stops 63. The functioning of these particular reduction means 62 for the apertures 64 of separator 61 is evident when following their path during their rotation. The movement of the harvester 60 through the water has the tendency to open flaps 62 toward the interior on the leading side. Flaps or pins 62 should have a greater specific weight than water so that the action of gravity assists in the step of reducing the size of the apertures 64. The abutment means 63 serve to hold flaps in an open position while berries 14 are caused to rise into the interior of harvester 60 while trash 15 with a greater dimension than berries 14 is held below separator 61. As the curved separator 61 rotates to leave the water, gravity and the forward movement of the assembly of harvesting apparatus 60 through the water forces the flaps 62 toward the outside or periphery of separator 61, closing its apertures 64 and reducing their size to a dimension smaller than berries 14. Two barriers 66 (only one is visible) close the sides of the cylinder or truncated cone of harvester 60. At least the rear one of these barriers 66 is holding axis of rotation 65. Vanes 67 are radially disposed inside separator 61 and connect with secondary separator 68, that has openings smaller than the berries 14 destined to be harvested. The assembly of vanes 67 and second grating 68 is the means to lift berries 14 out of the water. The second grating 68 defines a truncated cone with a curved surface inclined toward barrier 66 that has openings 69. The inclination of the cone shaped grating 68 will cause the lifted berries 14 to roll toward and through openings 69 and into a gravity feed chute (not shown) but similar in design to the one designated 48 and 49 in FIG. 4. The rotation of harvesting apparatus 60 synergistically transports the harvester 60, immerses the separator 61, opens and closes the flaps 62, separates trash 15 and berries 14, moves second separator 68 under berries 14 and lifts them out of the water and moves them by gravity down the inclined surface of second separator 68 and toward the point of loading. If the periphery of harvesting apparatus 60 is in the shape of a cone, the swath harvested by rotation through the bog will define a curved path. By extending the length of the chute or conveyor (not shown) subsequent sections of the area into which the cranberries 14 have been pushed can be harvested. Any of the alternate means to carry out the step of reducing the size of the apertures 64 of the separator 61 could be adapted to this embodiment in order that the harvester 60 could be used in the opposite direction to the shown rotation. The barriers 66 could be made from a suitable grating or even a transparent material and means should be provided to allow the unit to be able to be dismantled for cleaning and maintenance. The axle of rotation 65 and the chute or conveyor accepting the berries 14 should be attached and allow for the rotation of separator 61 and its attached baffles 67 and second separator 68. The rotation of harvesting apparatus 60 might be assisted by the suitable power means available to those skilled in the art.

Figure 7:
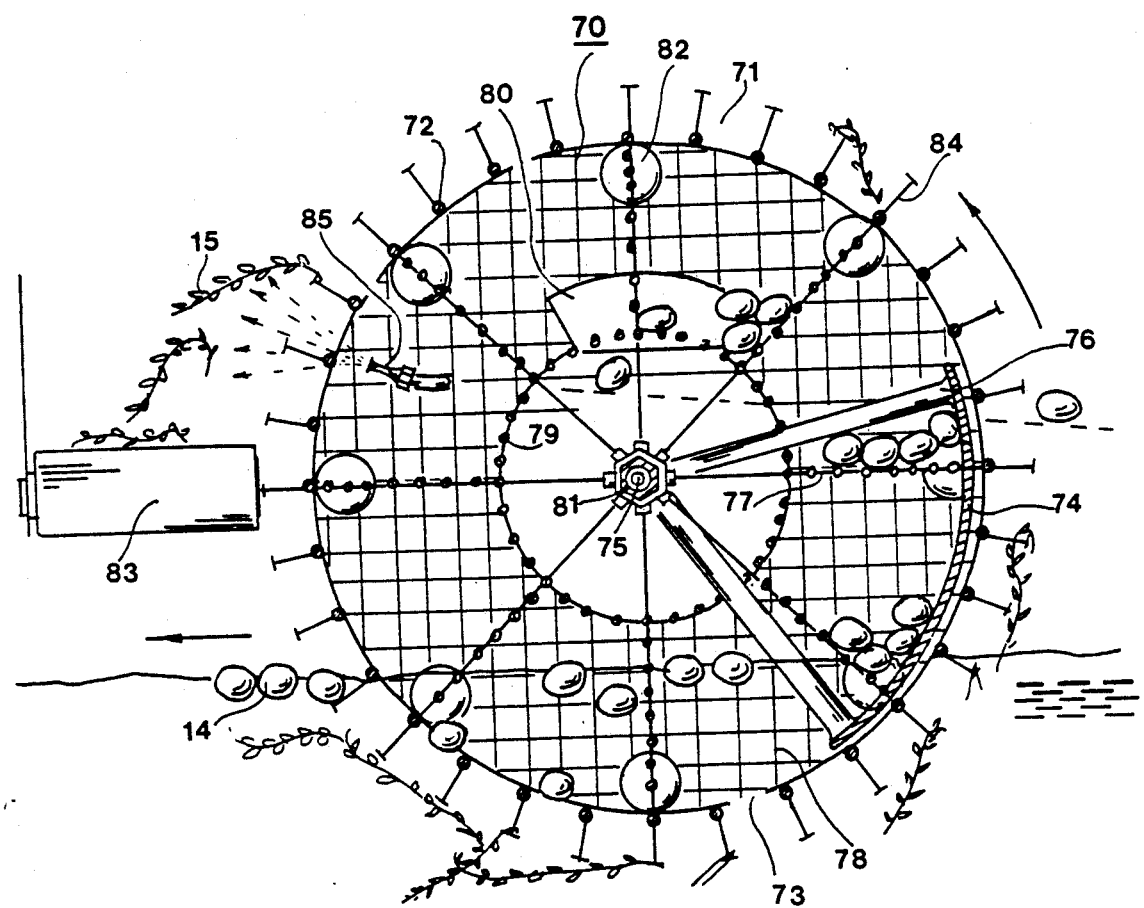
FIG. 7 is a sectioned view of a cranberry harvesting apparatus.

In FIG. 7 is illustrated in sectioned view cranberry harvester 70 with a periphery 71 curving around axis of rotation 75. Separator 72 is a grating having apertures 73 that are seen to permit the rising of cranberries 14 into the interior of harvesting apparatus 70. Shield 74 partially closes those apertures 73 that are in the trailing end of periphery 71 as it moves through the water floating the berries. Thus berries 14 floating inside the rolling harvester 70 are prevented from leaving through apertures 73 at this point, but are lifted out of the water by vanes 77. Shield 74 is held by suitable connection 76 fixed with respect to the side 78. Shield 74 can be selectively swiveled to the other side of the water surface so as to allow the periphery 71 to rotate in the opposite direction and therefore to harvest berries 14 when harvester 70 is rolled forward and backward in the bog. Suitable fixing means (not shown) can be used to lock connector 76 in selected positions near the axis of rotation 75. In this embodiment, the baffles 77 constitute the second separator and have openings that allow water to drain, but that are smaller than berries 14. Vanes 77 are used for the step to lift harvested fruit 14 out of the water. Vanes 77 are mounted by suitable bearings on axis of rotation 75 and are adapted to rotate inside connector 76 and shield 74. An inner cage 79 is disposed on vanes 77 and is shaped like the previously shown truncated cone so as to cause berries 14 to roll toward openings 80 in fixed side 78. At this point berries 14 could be loaded onto a chute or conveyor or collected in plastic bags. The vanes 77 are joined on the axis of rotation by hex-shaped adaptor 81 that links them to the periphery 71 that is rotably linked to axis 75 by a disc shaped member (not visible) that is opposite to side 78. This adaption 81 links baffles 77 and periphery 71 in such a way that the separator 72 and vanes 77 rotate in unison as harvester 70 is moved to depress trash 15 and gather berries 14. The wheels 82 on side 78 allow the separator 72 to rotate freely about the fixed side 78. One or more of these wheels 82 could be powered by appropriate means such as a hydraulic drive to rotate periphery 71 about the fixed side 78 and the axis of rotation 75 and thus drive harvesting apparatus 70 through the water. The assembly of this rotating harvester 70 is provided with the appropriate means (not visible) to disassemble the unit for cleaning and servicing. On the fixed axis of rotation 75 is first installed using suitable fixing means the connector 76 that serves to position shield 74 which is the means to reduce the size of apertures 72. Next, the bearings carrying adaption 81 and vanes 77 with cage 79 are fitted onto axis 75. Then, an optional second connector 76 (not visible in this section) could attached to the other end of shield 74 and be adapted to be freely rotating on adaptor 81. Adaptor 81 will now receive the separator 72, that slides onto the wheels 82 and is closed at its end by a disc (not visible) opposite side 78. An appropriate fixture such as a secured washer and nut holds the rotating assembly of the adaption 81, vanes 77, cage 79 and separator 72 in rotating alignment on axis of rotation 75. Optional conveyor 83 can be provided to transport trash 15 away for disposal. Trash 15 might be lifted by hooks 84 that are the lifting means to lift trash 15 up from the water as separator 72 rotates. Optional nozzle 85 is the removal means to assist in removing trash 15 from separator 72 and might direct a stream of water through the side 78 and separator 72, or be combined with shield 74 to dislodge this debris 15 outwardly and toward conveyor 83 that might be positioned on either side of water harvester 70. The rotating movement of separator 72 carries out synergistically the steps of immersing the separator 72, causing the debris 15 to be held below the separator 72, causing the berries 14 to rise through the apertures 73 toward the surface of the water, reducing the size of apertures 73 by the shield 74, moving the second separator 77 under the floating berries 14, lifting the berries 14 out of the water by using second separator or vanes 77 and causing them to move through openings 80 toward the point of loading by the slant of the inner cage 79.

Figure 8:
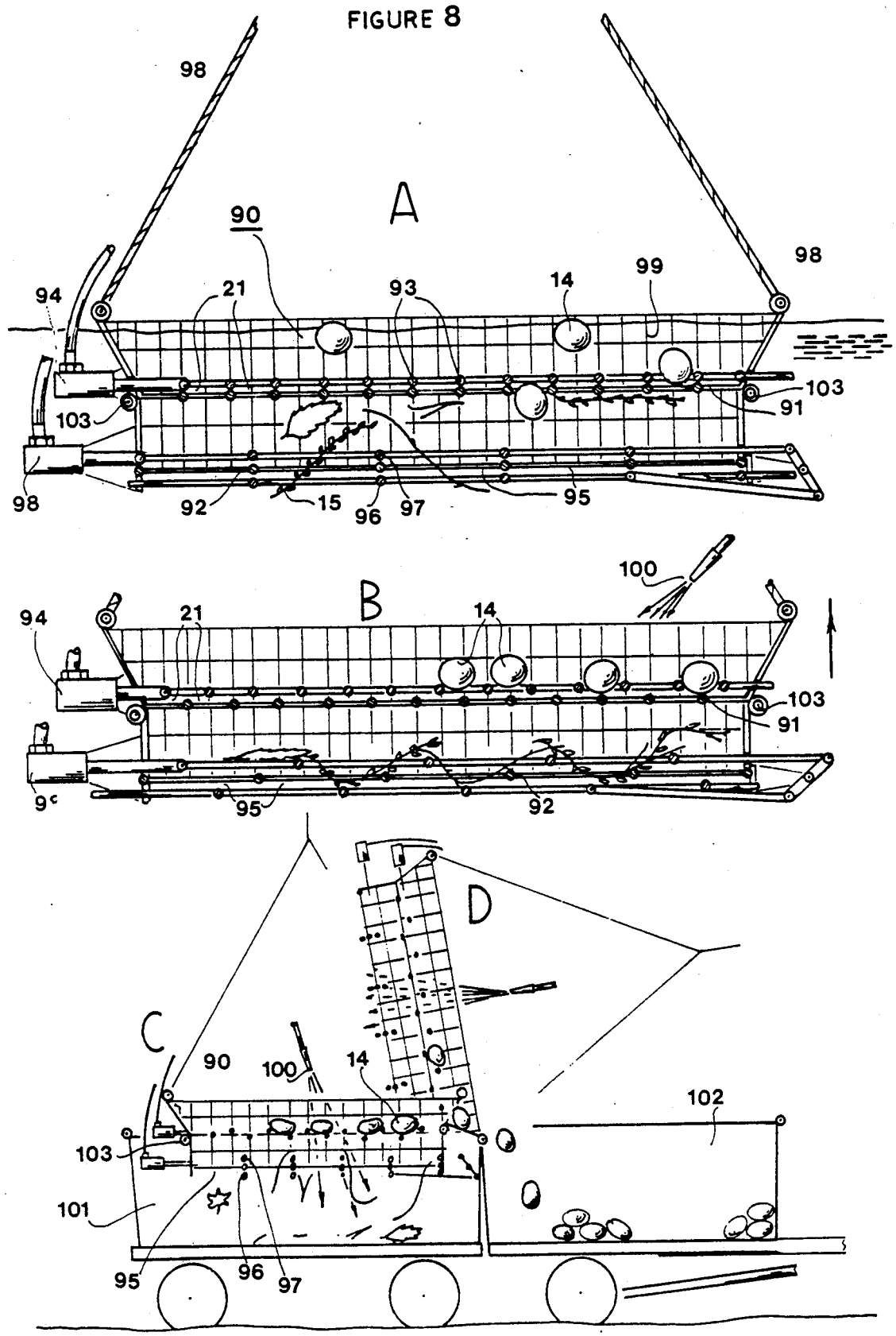
FIG. 8 is a sectioned view of a harvesting apparatus in four positions during the use of the invented method.

In FIG. 8 are schematically illustrated the four steps designated A,B,C and D of the usage of cranberry harvester 90 that is lifted by cable 98 worked by a crane or similar power equipment of proper capacity. This further preferred embodiment of the present invention allows growers to adapt the taught method to yet other conditions of their varied operations and equipment. The advantage of harvester 90 is the fact that it lifts berries 14 and trash 15 out of the bog without the use of a conveyor that is not an easy piece of equipment to move compared to a lightweight mobile crane that can be rented just for the short harvest period. For some growers the simultaneous removal of trash is important as it favors the maintenance of the vine and because the water floating the berries must be passed on to subsequent bogs to be flooded and harvested. Harvesting apparatus 90 has a separating means or separating mechanism that has separator grating 91 that holds trash 15 separated from berries 14 during the steps of the method to immerse separator 91 and causing berries 14 to float through apertures 21 in the water floating berries 14. The bars 93 of a sliding grid illustrated in previous figures are the means to reduce the apertures 21 to a dimension smaller than berries 14 using hydraulic actuator 94. Screen 99 with openings smaller than berries 14 acts as a barrier to trash 15 and berries 14 during the use of harvesting apparatus 90. A third and distinct element is the grid 92 that is the means to remove trash 15 from the water. The holes 95 admit the debris 15 above grid 92 so to allow the step of lifting the debris 15 out of the water. The means to change the size of holes 95 are the bars 96 and 97, movable via suitable leverage by hydraulic actuator 98. Openings or holes 95 are of a suitable large size to easily permit trash 15 to float through them and toward separator 91. If deemed necessary, a further set of restricting bars (not shown) similar in design to bars 96 and 97 could be slidably disposed on grid 92 to restrict holes 95 further, but acting in a direction offset by 90 degrees to the sliding action of the grid of bars 96 and 97. The grid of bars 96 and 97 is understood to slide at an angle of 45 degrees to the square holes 95 as it is advantageous for all the reduction means for the apertures of the previously illustrated separators. Position A of harvesting apparatus 90 shows both separator 91 and grid 92 open to allow the step of the method of causing berries 14 to rise through apertures 21 and holes 95 to the surface of the water. Trash 15 also passes through holes 95 but is shown retained below separator 91. Position B illustrates the step of lifting separator 91 out of the water. Berries 14 are carried above the now closed separator 91 and trash 15 above the now closed grid 92. The step of reducing apertures 21 and holes 95 is done once it is observed that berries 14 have been floated through apertures 21, aided if necessary by some agitation. Actuators 94 and 98 could be controlled by an operator in the bog, the crane and/or another near the transportation vehicle, according to the needs. Starting with position B, a water jet 100 fed by a pump from the bog could be used to wash the small leaves off berries 14. In position C harvester 90 is seen perched above container 101 that could be a tank holding some water. Appropriately positioned orifices (not shown) could be used to control the level of the water and keep the weight of the container manageable. At this point bars 96 and 97 are shown moved to open holes 95 while debris 15 is discharged into container 101. Water spray from nozzle 100 can be continued to lubricate berries 14 during the tilting of the harvester 90 that culminates in position D as berries 14 are seen to load into bin 102 for transport to the processing plant. The cycle would then be repeated. Loose pin hinges 103 on separator 91 would permit its separate tilting.

The dimensions of certain features of the various embodiments are not drawn to scale to enhance the features of small components such as the apertures of the separators. Various features illustrated in the disclosure are understood to be interchangeable between the various embodiments without departing from the spirit of the invention. The means to lift trash from the water, for example, can be fitted on all harvesters. They are understood to be useable in the flooded bog and separator tanks employed when the conventional harvesting method is used.

The invented method and apparatus shall be considered to be defined by the following claims.

I claim:

1. In a method to harvest berries having buoyancy in water, wherein berries are removed from their plants by mechanical means and said berries are floated in water, the improvement comprising the steps of:
   (a) immersing a separator having apertures greater in dimension than said berries into said water, thereby causing debris greater in at least one dimension present with said berries in said water to be held below said separator,
   (b) causing said berries to rise by their buoyancy through said apertures toward the surface of said water and
   (c) lifting said separator out of said water.

2. A method as defined in claim 1 wherein said separator is adapted by reduction means to reduce the dimension of said apertures and wherein said method comprises the further steps of reducing said apertures to a dimension smaller than the dimension of said berries and wherein said method comprises the step of lifting said berries with said separator.

3. A method as defined in claim 2 wherein said separator is part of a manual scoop and wherein said method comprises the step of manually submerging said separator and the step of manually reducing the size of said apertures and the step of manually lifting said separator.

4. A method as defined in claim 2 wherein said separator is part of a mechanically operated scoop adapted to immerse said separator into said water, said mechanically operated scoop adapted to change the size of said apertures by mechanical means and adapted to lift said separator by mechanical means and wherein said method comprises the step of using mechanical power means to immerse said separator, the step of reducing the size of said apertures and the step of lifting said separator out of said water.

5. A method as defined in claim 1 wherein said separator is part of a harvesting apparatus having a second separator provided adjacent to said separator, said second separator having openings smaller in dimension than said berries and wherein said method comprises the further step of moving said second separator in an at least partially rotating movement under said berries that are floated off the plants and the step of lifting said berries by means of said second separator out of the water.

6. A method as defined in claim 5 wherein said separator is part of a manually operated scoop and wherein said method comprises the step of manually guiding said partially rotating movement of said second separator and the step of manually lifting said berries with said second separator out of the water.

7. A method as defined in claim 5 wherein said second separator is part of a mechanically powered scoop and wherein said second separator is adapted by guiding means to guide said second separator under the berries that have been floated off the plants and wherein said method comprises the step of moving said second separator under said berries.

8. A method as defined in claim 2 wherein said separator is curved in one dimension and rotably disposed about an axis of rotation and wherein the step of immersing said separator comprises the step of rotating said separator that is curved in one dimension in said water and wherein the step of lifting said berries and lifting said separator includes the step of rotating said separator that is curved in one dimension.

9. A method as defined in claim 5 wherein said separator is curved in one dimension and is rotably disposed about an axis of rotation and wherein said second separator is disposed inside said separator that is curved in one dimension and wherein said method comprises the step of lifting said second separator out of said water by rotating said separator that is curved in one dimension.

10. A method as defined in claim 1 wherein said separator is equipped with lifting means to lift said debris from the flooded bog and wherein said separator comprises removal means to remove said debris from said separator and wherein said method comprises the additional steps of lifting said debris from said water and removing said debris from said separator.

11. In a harvesting apparatus for water harvesting of berries that have been previously removed from their plant or vine and floated in water, said harvesting apparatus having a separating means adapted to separate said berries floated in said water from debris larger in at least one dimension also present in said water, said separating means having a separator having apertures larger than said berries and means to submerge said separator into said water, the improvement comprising:
a second separator disposed adjacent to said separator, said second separator having openings smaller than said berries and comprising the lifting means to lift said berries out of the water.

12. A harvesting apparatus as defined in claim 11 wherein said harvesting apparatus is a manually operated scoop having a handle and wherein said handle is the means to move said second separator under said berries floated in said water and to lift said second separator out of said water.

13. A harvesting apparatus as defined in claim 11 wherein said separator is part of a mechanically powered scoop and wherein said separator and said second separator are adapted to be immersed into said water and lifted out of said water by mechanical power means and wherein said second separator has guiding means to move said second separator under said berries floated in said water while said separator is submersed.

14. In a harvesting apparatus for water harvesting of berries that have been previously removed from their plant or vine and floated in water, said harvesting apparatus having a separating means adapted to separate said berries floated in said water from debris larger in at least one dimension also present in said water, said separating means having a separator with apertures larger than said berries and means to submerge said separator into said water, said separator having reduction means adapted to reduce the size of said apertures to a dimension smaller than said berries, the improvement comprising:
said separator curving in at least one dimension and disposed about an axis of rotation and vanes disposed inside said separator directed substantially toward said axis of rotation, said vanes adapted to contribute to lift said berries that have been floated in said water out of said water.

15. A harvesting apparatus as defined in claim 11 wherein said separator is curved in one dimension and rotably disposed about an axis of rotation on suitable bearings and wherein said second separator is disposed inside said separator and comprises vanes substantially radially disposed on said second separator and wherein said harvesting apparatus comprises a shield or cover disposed adjacent to said separator so as to slide past said separator adapted by suitable bearings to allow said separator to rotate past said shield, said shield covering a selected portion of said separator and adapted to reduce the size of said apertures.

16. In a harvesting apparatus for water harvesting of berries that have been previously removed from their plant or vine and floated in water, said harvesting apparatus having a separating means adapted to separate said berries floated in said water from debris larger in at least one dimension also present in said water, said separating means having a separator with apertures larger than said berries and means to submerge said separator into said water, the improvement comprising:
removing means adapted to remove said debris from said water, said removing means comprising a grid with holes sufficiently large to allow the passage of said debris, said grid having means to change the size of said holes to a size that allows to retain said debris above said grid.

* * * * *